US010066782B2

(12) United States Patent
Bax et al.

(10) Patent No.: US 10,066,782 B2
(45) Date of Patent: Sep. 4, 2018

(54) COUNTERBALANCE APPARATUS AND/OR METHOD FOR SUPPORTING A LOAD

(71) Applicants: CENTRE FOR IMAGING TECHNOLOGY COMMERCIALIZATION (CIMTEC), London, Ontario (CA); THE UNIVERSITY OF WESTERN ONTARIO, London, Ontario (CA)

(72) Inventors: Jeffrey Bax, London (CA); Dandan Shan, London (CA); Christopher Waring, London (CA); Aaron Fenster, London (CA)

(73) Assignees: Centre for Imaging Technology Commercialization (CIMTEC), London, Ontario (CA); Aaron Fenster, London, Ontario (CA)

( * ) Notice: Subject to any disclaimer, the term of this patent is extended or adjusted under 35 U.S.C. 154(b) by 0 days.

(21) Appl. No.: 15/543,448

(22) PCT Filed: Jan. 14, 2015

(86) PCT No.: PCT/CA2015/000023
§ 371 (c)(1),
(2) Date: Jul. 13, 2017

(87) PCT Pub. No.: WO2016/112452
PCT Pub. Date: Jul. 21, 2016

(65) Prior Publication Data
US 2018/0023758 A1 Jan. 25, 2018

(51) Int. Cl.
*F16M 13/02* (2006.01)
*F16M 11/38* (2006.01)
(Continued)

(52) U.S. Cl.
CPC ............ *F16M 13/02* (2013.01); *F16M 11/10* (2013.01); *F16M 11/2092* (2013.01);
(Continued)

(58) Field of Classification Search
CPC .... F16M 13/02; F16M 11/10; F16M 11/2092; F16M 11/38; F16M 11/42; F16M 11/121;
(Continued)

(56) References Cited

U.S. PATENT DOCUMENTS 3,774,873 A * 11/1973 Krogsrud ............... A47G 29/00
248/324
4,017,168 A * 4/1977 Brown ................... F16M 11/10
248/586
(Continued)

*Primary Examiner* — Anita M King
(74) *Attorney, Agent, or Firm* — Knobbe, Martens, Olson & Bear, LLP

(57) ABSTRACT

A counterbalance apparatus for supporting a load includes a base, a load bearing arm, a toggle linkage, and first and second resilient members for applying a force to the load bearing arm. The load bearing arm has pivot points forming a parallelogram linkage, and is adapted to support the load at a distal end. The toggle linkage can include an adjustment member positioned to define a distance relative to the attachment point. The first resilient member is adapted to apply a force to the load bearing arm and may have a first end connected to a first portion of the parallelogram linkage and a second end connected to the adjustment member. Movement of the toggle linkage to the load bearing position engages the forces of the resilient members and movement of the adjustment member varies the distance to adjust a support vector adapted to counterbalance the load vector.

17 Claims, 12 Drawing Sheets

(51) Int. Cl.
   *F16M 11/10* (2006.01)
   *F16M 11/20* (2006.01)
   *F16M 11/42* (2006.01)

(52) U.S. Cl.
   CPC ............ *F16M 11/38* (2013.01); *F16M 11/42* (2013.01); *F16M 2200/048* (2013.01); *F16M 2200/061* (2013.01)

(58) Field of Classification Search
   CPC ........ F16M 2200/048; F16M 2200/061; F16F 2228/10
   USPC ........ 248/576, 573, 575, 584, 585, 586, 587
   See application file for complete search history.

(56) References Cited

U.S. PATENT DOCUMENTS

| | | | |
|---|---|---|---|
| 4,160,536 A * | 7/1979 | Krogsrud | F16M 11/04 248/123.11 |
| 4,208,028 A | 6/1980 | Brown et al. | |
| 4,266,747 A | 5/1981 | Souder, Jr. et al. | |
| 4,312,491 A | 1/1982 | Aondetto | |
| 4,447,031 A | 5/1984 | Souder, Jr. et al. | |
| 4,460,148 A | 7/1984 | Sasaki | |
| 4,523,732 A | 6/1985 | Biber et al. | |
| 4,637,536 A * | 1/1987 | Wong | A45F 5/00 224/261 |
| 4,930,598 A | 6/1990 | Murrill et al. | |
| 5,180,136 A | 1/1993 | Soya | |
| 5,360,196 A | 11/1994 | DiGiulio et al. | |
| 5,435,515 A | 7/1995 | DiGiulio et al. | |
| 5,569,013 A | 10/1996 | Evans et al. | |
| 5,609,316 A * | 3/1997 | Tigliev | A61B 90/25 248/123.11 |
| 7,104,512 B2 | 9/2006 | Wolf et al. | |
| 7,618,016 B2 | 11/2009 | Brown | |
| 8,066,251 B2 | 11/2011 | Brown | |
| 8,342,467 B2 | 1/2013 | Stachowski et al. | |
| 2003/0071178 A1* | 4/2003 | Spadea | F16M 11/10 248/162.1 |
| 2004/0164213 A1* | 8/2004 | Stephan | F16M 11/10 248/280.11 |
| 2007/0221895 A1 | 9/2007 | Pieger et al. | |
| 2010/0065705 A1 | 3/2010 | Brown et al. | |
| 2012/0158013 A1 | 6/2012 | Stefanchik et al. | |
| 2014/0291457 A1* | 10/2014 | Rotheisler | F16M 11/2085 248/123.2 |
| 2015/0001269 A1 | 1/2015 | Sacksteder | |

\* cited by examiner

COUNTERBALANCE APPARATUS AND/OR METHOD FOR SUPPORTING A LOAD

FIELD OF THE INVENTION

The present invention relates generally to a counterbalance apparatus and/or method for supporting a load, and more particularly to a single point adjustable counterbalance apparatus and/or method for supporting loads of different weights using a parallelogram linkage.

BACKGROUND OF THE INVENTION

Many scientific, medical and industrial tasks involve the deployment of objects or instruments, which may need to be held aloft and manipulated in space for extended periods of time, resulting in repetitive stress to the user. The resulting repetitive stresses are known to be a cause of work-related trauma.

For example, work-related musculoskeletal disorders have been identified as a widespread problem amongst diagnostic medical sonographers and vascular technologists. In 2006, approximately 46,000 sonographer and vascular technologist job positions existed in the United States. A representative survey reported nearly 90% of sonographers and vascular technologists report completing ultrasound scans while in some form of pain. Aggravating factors for pain during procedures was reported by sonographers to include sustained and repeated twisting of the neck and body, sustained arm abduction and application of pressure on the ultrasound transducer.

In a further example, heavy tools or parts may require maneuvering in repetitive or awkward motions by workers within industrial settings. Workers may also be required to maintain fixed poses for extended periods of time. Poor ergonomics adversely affect the productivity as well as the health and safety of workers within industrial settings.

To improve worker ergonomics, various devices have been developed to counterbalance objects and instruments, including, but not limited to, heavy tools or parts. While fixed arm supports and supports that permit some lateral motion are known in the art, some tasks require a larger range of horizontal and vertical motions, preferably at least two or three degrees of freedom ("DOF"). Industrial, medical and scientific operations, including, but not limited to surgical, industrial, diagnostic and therapeutic procedures, could greatly benefit from having gravity effectively negated for the user in a manner that can provide larger ranges of motion in an isoelastic manner. The term isoelastic may refer to the application of a constant force by a user to move the arm throughout its full range of motion. For example, Equipois Inc. (Manchester, N.H.) have developed spring loaded counterbalancing arms (e.g., the zeroG™ mechanical arm) including self-supporting counterbalancing arms adapted to position tools and parts in industrial settings employing serially connected parallelogram segments. Springs may be used to counterbalance the load and any subsequent segments in the arm. The preload of the spring in each segment may be adjusted to accommodate loads of varying weights.

Such prior art devices may present drawbacks however. To adjust the load carrying capacity of the arm, the user may be required to make multiple adjustments to various elements making the use thereof slow and cumbersome. If the arm is not isoelastic, the user may experience inconsistent performance as the user may need to use greater force to adjust the arm in different positions. The isoelasticity of the zeroG™ may be inversely related to the amount of rate adjustment. As rate adjustment increases to allow operation at extreme angles, isoelasticity may decrease degrading overall performance throughout the full range of motion.

In the field of diagnostic medical sonography and vascular technology, for example, previous counterbalancing arms may have used high torque motors to counterbalance the load weight creating potential harm for a patient. In the event of a malfunction, the motors may potentially drive the arm into the patient with a minimum force of twice the weight of the arm. In the event of a power failure, a traditional arm may lose its pose and slump under its own weight as the motors can no longer counterbalance the weight. While brakes may have been applied to prevent traditional arms from slumping in a power failure, the traditional arm may become fully locked (i.e., un-adjustable) until power is restored.

What is needed is a counterbalance apparatus and/or method that overcomes one or more of the limitations associated with the prior art. It may be advantageous to provide an apparatus and/or method which facilitate the counterbalancing of loads having different weights.

Prior attempts, if any, to solve problems associated with prior art devices and/or methods may have been unsuccessful and/or had one or more disadvantages associated with them. Prior art devices and/or methods have been ill-suited to solve the stated problems and/or the shortcomings which have been associated with them.

It is an object of the present invention to obviate or mitigate one or more of the aforementioned disadvantages and/or shortcomings associated with the prior art, to provide one of the aforementioned needs or advantages, and/or to achieve one or more of the aforementioned objectives of the invention.

SUMMARY OF THE INVENTION

According to the invention, there is disclosed a counterbalance apparatus for supporting a load having a load vector applied in a direction of the vector of gravity. The apparatus includes a base, a load bearing arm, a toggle linkage, and a first and second resilient member. The load bearing arm consists of a plurality of pivot points forming a parallelogram linkage, and may project from the base at an attachment point at a proximal end and is adapted to support the load at a distal end. The toggle linkage may be pivotally connected to the base and movable between a non-load bearing position and a load bearing position. The toggle linkage may also comprise an adjustment member positioned to define a distance relative to the attachment point. The first resilient member is adapted to apply a force to the load bearing arm and may have a first end connected to a first portion of the parallelogram linkage and a second end connected to the adjustment member; and the second resilient member is also adapted to apply a force to the load bearing arm and may have a first end connected to a second portion of the parallelogram linkage and a second end connected to the adjustment member. Movement of the toggle linkage from the non-load bearing position to the load bearing position engages the forces of the first and second resilient members and movement of the adjustment member varies the distance between the adjustment member and the attachment point to adjust a support vector adapted to counterbalance the load vector.

According to an aspect of one preferred embodiment of the invention, the counterbalance apparatus may preferably, but need not necessarily, also include an engagement arm having a toggle pin, the engagement arm pivotally connected to the base and configured to engage the toggle linkage for pivoting between the non-load bearing position and the load bearing position.

According to an aspect of one preferred embodiment of the invention, the counterbalance apparatus may preferably, but need not necessarily, further include a tuning member received by the engagement arm and threadably received by the toggle pin, the tuning member configured to vary the distance upon its rotation.

According to an aspect of one preferred embodiment of the invention, the first and second resilient members may preferably, but need not necessarily, be adapted to produce a linear extension force when the distance decreases.

According to an aspect of one preferred embodiment of the invention, the first and second resilient members may preferably, but need not necessarily, be adapted to produce a linear compression force when the distance increases.

According to an aspect of one preferred embodiment of the invention, the first and second resilient members may preferably, but need not necessarily, be a pair of resilient members.

According to an aspect of one preferred embodiment of the invention, the parallelogram linkage may preferably, but need not necessarily, include at least one parallelogram.

According to an aspect of one preferred embodiment of the invention, the parallelogram linkage may preferably, but need not necessarily, include at least one compound parallelogram.

According to an aspect of one preferred embodiment of the invention, the load may preferably, but need not necessarily, be reversibly coupled to a distal pivot point of the load bearing arm by a load release mechanism.

According to an aspect of one preferred embodiment of the invention, the base may preferably, but need not necessarily, be connected to a fixed support.

According to an aspect of one preferred embodiment of the invention, the counterbalance apparatus may preferably, but need not necessarily, further include a brake adapted to maintain a position with respect to the load.

According to an aspect of one preferred embodiment of the invention, the support vector may preferably, but need not necessarily, counterbalance the load vector with at least two degrees of freedom.

According to an aspect of one preferred embodiment of the invention, there is disclosed a method of supporting a load having a load vector applied in a direction of the vector of gravity using a counterbalance apparatus. The method includes: a step of attaching the load to a distal end of a load bearing arm projecting from a base at an attachment point at a proximal end, the load bearing arm with a plurality of pivot points forming a parallelogram linkage; a step of positioning a toggle linkage having an adjustment member, the toggle linkage pivotally connected to the base and movable between a non-load bearing position and a load bearing position, to define a distance between the adjustment member and the attachment point; and a step of configuring a first resilient member to apply a force to the load bearing arm by connecting a first end to a first portion of the parallelogram linkage and a second end to the adjustment member and configuring a second resilient member to apply a force to the load bearing arm by connecting a first end to a second portion of the parallelogram linkage and a second end to the adjustment member, to move the toggle linkage from the non-load bearing position to the load bearing position to engage the forces of the first and second resilient members and move the adjustment member to vary the distance for adjusting a support vector to counterbalance the load vector.

According to an aspect of one preferred embodiment of the invention, the method may preferably, but need not necessarily, further include the use of an engagement arm having a toggle pin, the engagement arm pivotally connected to the base to pivot the toggle linkage between the non-load bearing position and the load bearing position.

According to an aspect of one preferred embodiment of the invention, the method may preferably, but need not necessarily, further include the use of a tuning member, received by the engagement arm and threadably received by the toggle pin to, upon the rotation of the tuning member, vary the distance.

According to an aspect of one preferred embodiment of the invention, the first and second resilient members may preferably, but need not necessarily, be used to produce a linear extension force when the distance decreases.

According to an aspect of one preferred embodiment of the invention, the first and second resilient members may preferably, but need not necessarily, be used to produce a linear compression force when the distance increases.

According to an aspect of one preferred embodiment of the invention, the first and second resilient members may preferably, but need not necessarily, each comprise a pair of resilient members.

According to an aspect of one preferred embodiment of the invention, the parallelogram linkage may preferably, but need not necessarily, include at least one parallelogram.

According to an aspect of one preferred embodiment of the invention, the parallelogram linkage may preferably, but need not necessarily, include at least one compound parallelogram.

According to an aspect of one preferred embodiment of the invention, the method may preferably, but need not necessarily, further include the use of a load release mechanism to reversibly couple the load to a distal pivot point of the load bearing arm.

According to an aspect of one preferred embodiment of the invention, the base may preferably, but need not necessarily, be connected to a fixed support.

According to an aspect of one preferred embodiment of the invention, the method may preferably, but need not necessarily, further include the use of a brake to maintain a position with respect to the load.

According to an aspect of one preferred embodiment of the invention, the support vector may preferably, but need not necessarily, counterbalance the load vector with at least two degrees of freedom.

According to an aspect of one preferred embodiment of the invention, there is disclosed a counterbalance apparatus for supporting a load having a load vector applied in a direction of the vector of gravity. The apparatus includes a base, a load bearing arm, and a first and second resilient member. The base is movable between a load bearing and a non-loading position. The load bearing arm consists of a plurality of pivot points forming a parallelogram linkage, and may project from the base at an attachment point at a proximal end and is adapted to support the load at a distal end. The first resilient member is adapted to apply a force to the load bearing arm having a first end connected to a first portion of the parallelogram linkage and a second end connected to an attachment point of the base; and the second resilient member is adapted to apply a force to the load bearing arm having a first end connected to a second portion of the parallelogram linkage and a second end connected to the attachment point of the base. Movement of the base from the non-load bearing position to the load bearing position engages the forces of the first and second resilient members to apply a support vector to counterbalance the load vector.

Other advantages, features and characteristics of the present invention, as well as methods of operation and functions of the related elements of the apparatus and method, and the combination of steps, parts and economies of manufacture, will become more apparent upon consideration of the following detailed description and the appended claims with reference to the accompanying drawings, the latter of which are briefly described hereinbelow.

BRIEF DESCRIPTION OF THE DRAWINGS

The novel features which are believed to be characteristic of the apparatus and method according to the present invention, as to their structure, organization, use, and method of operation, together with further objectives and advantages thereof, will be better understood from the following drawings in which presently preferred embodiments of the invention will now be illustrated by way of example. It is expressly understood, however, that the drawings are for the purpose of illustration and description only, and are not intended as a definition of the limits of the invention. In the accompanying drawings.

DETAILED DESCRIPTION OF THE PREFERRED EMBODIMENTS

Figure 1:
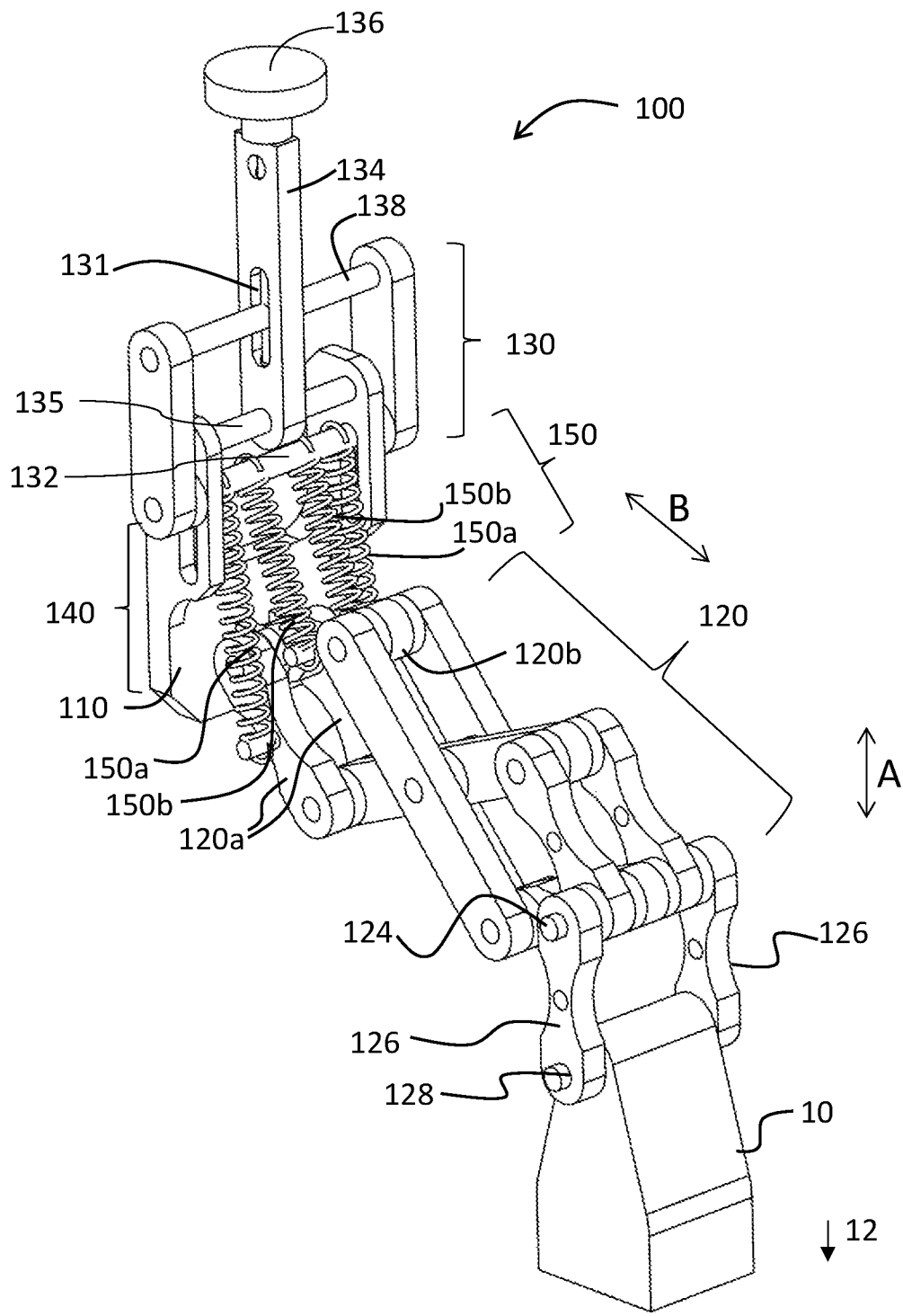
FIG. 1 is a perspective view of an apparatus with a load.

The description that follows, and the embodiments described therein, is provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals. The drawings are not necessarily to scale and in some instances proportions may have been exaggerated in order to more clearly depict certain embodiments and features of the invention.

In this disclosure, a number of terms and abbreviations are used. The following definitions of such terms and abbreviations are provided.

As used herein, a person skilled in the relevant art may generally understand the term "comprising" to generally mean the presence of the stated features, integers, steps, or components as referred to in the claims, but that it does not preclude the presence or addition of one or more other features, integers, steps, components or groups thereof.

In the description and drawings herein, and unless noted otherwise, the terms "vertical", "lateral" and "horizontal", are generally references to a Cartesian co-ordinate system in which the vertical direction generally extends in an "up and down" orientation from bottom to top (y-axis) while the lateral direction generally extends in a "left to right" or "side to side" orientation (x-axis). In addition, the horizontal direction extends in a "front to back" orientation and can extend in an orientation that may extend out from or into the page (z-axis). Unless indicated otherwise, the force or vector of gravity acts parallel to the y-axis (e.g., the vertical direction) in a general downward manner.

As used herein, a person skilled in the relevant art would understand an articulating (e.g., positionable or repositionable), force exerting (e.g., load bearing) arm as a load bearing apparatus well known in the art. Such an apparatus may comprise, in a preferred embodiment of the present invention, one or more parallelogram or compound parallelogram linkages in a scissor arrangement, such as disclosed in one or more of U.S. Pat. No. 4,930,598, U.S. Pat. No. 5,569,013, and U.S. Patent Application No. 2007/0221895, each incorporated herein by reference. A person skilled in the relevant art will understand that load bearing arms of several well-known configurations could be used in the present invention.

As used herein, a person skilled in the relevant art would understand that a "resilient member" may comprise one or more of any of the following elastic, pneumatic, gas spring, constant force spring motor, or other device adapted to store or exert mechanical energy, generate force and/or that is back-drivable (e.g., force applied to an output can move an input). In a preferred embodiment, a resilient member may comprise a spring and in a more preferred embodiment, may comprise a compression or extension spring.

As used herein, a person skilled in the relevant art would understand that a parallelogram is a quadrilateral with two pairs of parallel sides. The opposite or facing sides of a parallelogram are of equal length and the opposite angles of a parallelogram are of equal measure. Parallelograms may include, but are not limited to, rhomboids, rectangles, rhombuses, and squares. Those skilled in the relevant art would understand that a parallelogram of the present invention may be disposed in single or compound linkages, wherein it will be understood that a compound parallelogram generally may comprise two parallelograms with a common side.

There is a need in the art for apparatus and methods for exerting a force (e.g., to counteract the force of gravity) in order to reduce the physical effort exerted by users in various settings, including, but not limited to, medical professionals in performing medical examinations (e.g., ultrasound examinations). More particularly, there is a need in the art for an apparatus that can counterbalance a load for manipulation in more than one DOF.

An aspect of the present invention thereby preferably provides assemblies and methods to reduce the physical strain which may be experienced by users, including, but not limited to, medical practitioners who perform ultrasound examinations and similar medical procedures. It will be understood, however, that the present invention may be used to assist the performance of various tasks found in other settings, including, but not limited to, industrial environments.

In order that the invention may be more fully understood, it will now be described, by way of example, with reference to the accompanying drawings in which FIG. 1 through FIG. 6B illustrate embodiments of the present invention.

Referring to FIG. 1, there is shown a counterbalance apparatus 100 for supporting a load 10. In a preferred embodiment, the apparatus 100 includes a base 110 and a load bearing arm 120. The load bearing arm 120, in the preferred embodiments shown in the FIGS., would be considered an articulating force exerting arm and is an example of such. In a preferred embodiment, the force exerting (e.g., load bearing) arm 120 is provided with a plurality of pivot points so as to generally form a parallelogram linkage. Better shown in FIG. 3A, the load bearing arm 120 projects generally laterally from the base 110 at an attachment point 122 and is adapted to support the load 10 at a distal end—preferably at a distal pivot point 124. Those skilled in the relevant art would understand that the attachment point 122 may include any movable (including, but not limited to, pivotable attachments, ball joints, universal joints) and non-movable (i.e., fixed) attachment mechanisms that may be known in the prior art.

In a preferred embodiment, such as shown FIG. 1, the parallelogram linkage may be a compound parallelogram. It will be understood, by a person skilled in the relevant art, however, that the load bearing arm 120 can comprise a single parallelogram linkage as well as more than one such linkage. In a preferred embodiment, the parallelogram linkage comprises one or more compound parallelograms. In such a preferred configuration, the load bearing arm 120 is provided with at least two DOF (e.g., lateral movement and vertical movement). In addition, preferred embodiments may include a load coupler 126 pivotally attached to the distal pivot point 124 and adapted to engage the load 10. In addition, skilled readers will appreciate that the parallelogram linkage of the present invention may include one or more parallelograms in parallel and/or in series.

As described above, the load bearing arm 120 may be a parallelogram or, as provided in FIG. 1, a compound parallelogram. Those skilled in the art will appreciate that the use of a compound parallelogram to provide movement in at least two DOF (see arrows A and B in FIG. 1) provides numerous advantages when compared to two serially connected parallelograms, such as those disclosed by the prior art. For example, the compound parallelogram may facilitate comparable movement (i.e., two DOF if the load bearing arm 120 is fixed at the base 110 and at least three DOF if the load bearing arm 120 is pivotable about a vertical axis relative to the base 110, such as shown, for example, in FIGS. 7A and 7B) to the two serially connected parallelogram arms provided in the prior art except more readily adapt to different loads 10. In addition, persons of skill in the art will also understand that the load bearing arm 120 may include greater than two parallelograms and that increasing the number of parallelograms may allow for an increase in the reach of the load bearing arm 120 (e.g., distance movable away from the base 110).

In addition, as shown in FIG. 1, the apparatus 100 further includes a toggle linkage or mechanism 130 movably connected to the base 110 and movable between a non-load bearing position and a load bearing position. Such linkage mechanisms are well known in the art and will be understood to encompass a combination of links (including, but not limited to, bars), connected by one or more pin (or hinge) joints that are so arranged that a relatively small force applied at one point may create a relatively larger force at another point. In some embodiments, an engagement arm stop 137 (shown in FIGS. 6A and 6B) may be a bar, a pin, or any other mechanism to ensure that the toggle linkage 130 does not travel past the load bearing position and may be used to ensure that the toggle linkage 130 is in the load bearing position. In preferred embodiments, the toggle linkage 130 further comprises an adjustment member 132 and a toggle pin 138. Those skilled in the art, however, will understand that the toggle linkage 130 may be connected to the base 110 by projections, bars, or any other connection apparatus known in the art, alone or in combination, including, in a preferred embodiment or the present invention, a pivoting connection. The toggle linkage 130 may be positioned to define a distance 140 relative to the attachment point 122. In a preferred embodiment, the distance 140 is determined as between the adjustment member 132 and the attachment point 122. A person skilled in the art, however, would understand that locations on the toggle linkage 130 other than the adjustment member 132 may be used to determine the distance 140 from the attachment point 122.

It will be understood by a person skilled in the art that an embodiment of the present invention may not have a toggle linkage 130 or force adjustment apparatus. Where the load 10 is of a known weight and which may be unchanging, the resilient members 150 can be merely attached to a movable base (not shown). The resilient members 150 may also generate a known, nonadjustable force. In this embodiment, the base is movable (i.e. pivotable) between a load bearing and a non-loading position in which the resilient members 150 are engaged or not engaged respectively (e.g., on and off). Once the known load 10 is attached to the load bearing arm 120, the base is moved to the load bearing position and the resilient members 150 are then engaged such that the load 10 is lifted and the force of gravity is negated.

In one embodiment, the apparatus 100 includes a first resilient member 150a having a first end connected to a first portion 120a of the parallelogram linkage proximal to the base 110 and a second end connected to the adjustment member 132 of the toggle linkage 130; and a second resilient member 150b having a first end connected to a second portion 120b of the parallelogram linkage proximal to the base 110 and a second end connected to the adjustment member 132 of the toggle linkage 130. It will be understood by a person skilled in the relevant art that the first resilient member 150a and the second resilient member 150b may also be generally referred to collectively as resilient members 150. It will also be understood by skilled readers that the apparatus 100 may comprise at least two resilient members 150 (e.g., 150a and 150b) and that almost any number of the at least two resilient members 150 may act in parallel or series to function as a single resilient member. In a preferred embodiment, each of the first and single resilient members 150a,b are a pair of resilient members 150 (as shown in FIG. 1).

The resilient members 150a,b may be adapted to support loads of different weights or load vectors 12. In a preferred embodiment, second ends of the resilient members 150a,b are each connected to the adjustment member 132. The first and second portions 120a,b of the load bearing arm 120 would be considered in a preferred embodiment to be proximal to the attachment point 122. In addition, while it will be understood that the first ends of the resilient members 150a,b may be connected to any attachment point along the length of the respective first and second portions 120a,b, the resilient members 150a,b are connected at the mid-points of each respective first and second portions 120a,b in a preferred embodiment as provided in FIG. 1. Persons of skill in the art would understand that the attachment point along the arm may be determined by various well known factors, including the properties of the resilient members 150a,b (e.g., the spring constant), the maximum designed load carrying capacity of the load bearing arm 120, the length of the load bearing arm 120, and the range of motion of the load bearing arm 120.

Figure 3A:
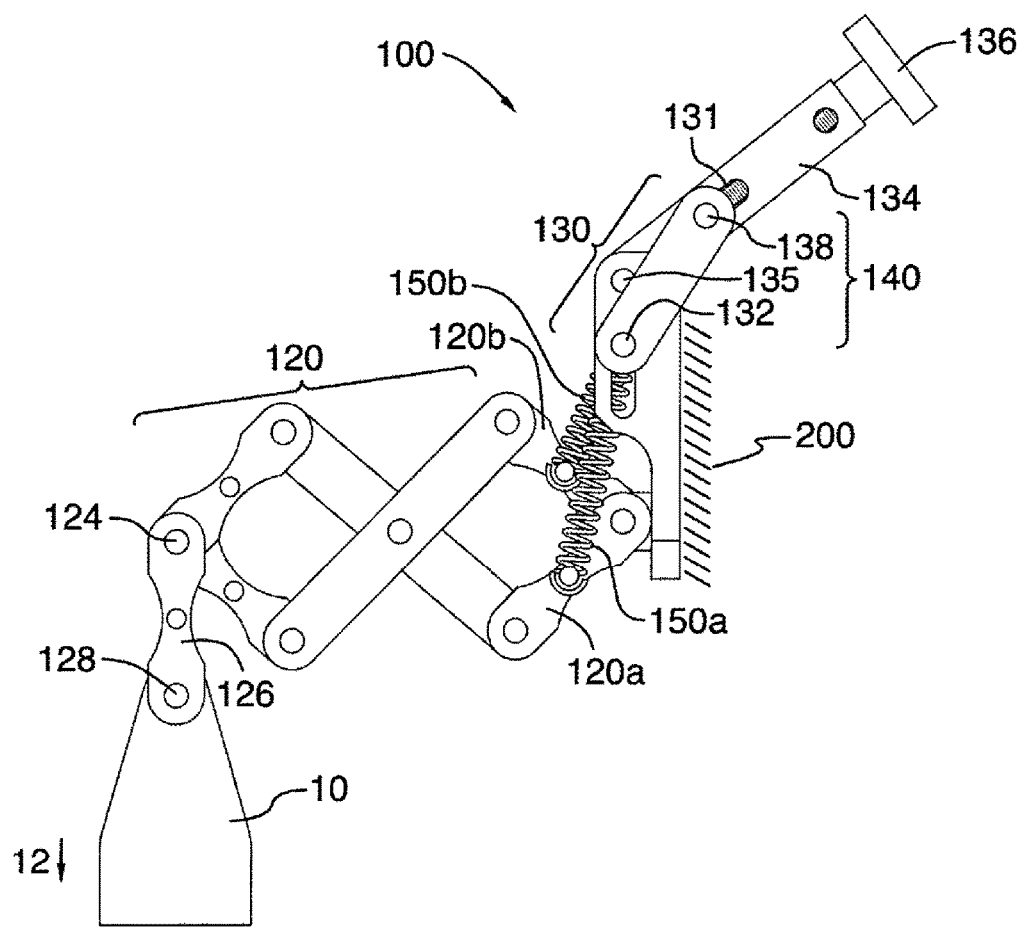
FIGS. 3A and 3B are a side view and an enlarged perspective view, respectively, of the apparatus of FIG. 1.

In another embodiment, the base 110 may be attached to a fixed support 200 (as best shown in FIG. 3A) having a fixed orientation to gravity, for example, a wall or the ground.

The load bearing arm 120 is adapted to support load 10 (as shown in FIG. 1) of varying weight or force vectors 12 by adjusting the force applied to the load bearing arm 120 by the resilient members 150a,b. As will be appreciated by those skilled in the art, varying the distance 140 may increase or decrease the force exerted by the resilient members 150a,b upon the load bearing arm 120. As shown in FIGS. 1-5 and 7A and 7B, for example, where if the resilient members 150a,b are configured to exert a linear extension force (e.g., a compression spring), decreasing the distance 140 may decrease the carrying capacity of the apparatus 100. Alternatively, if the resilient members 150a,b are configured to exert a linear compression force (e.g., an extension spring), increasing the distance 140 may increase the carrying capacity of the apparatus 100.

Figure 6A:
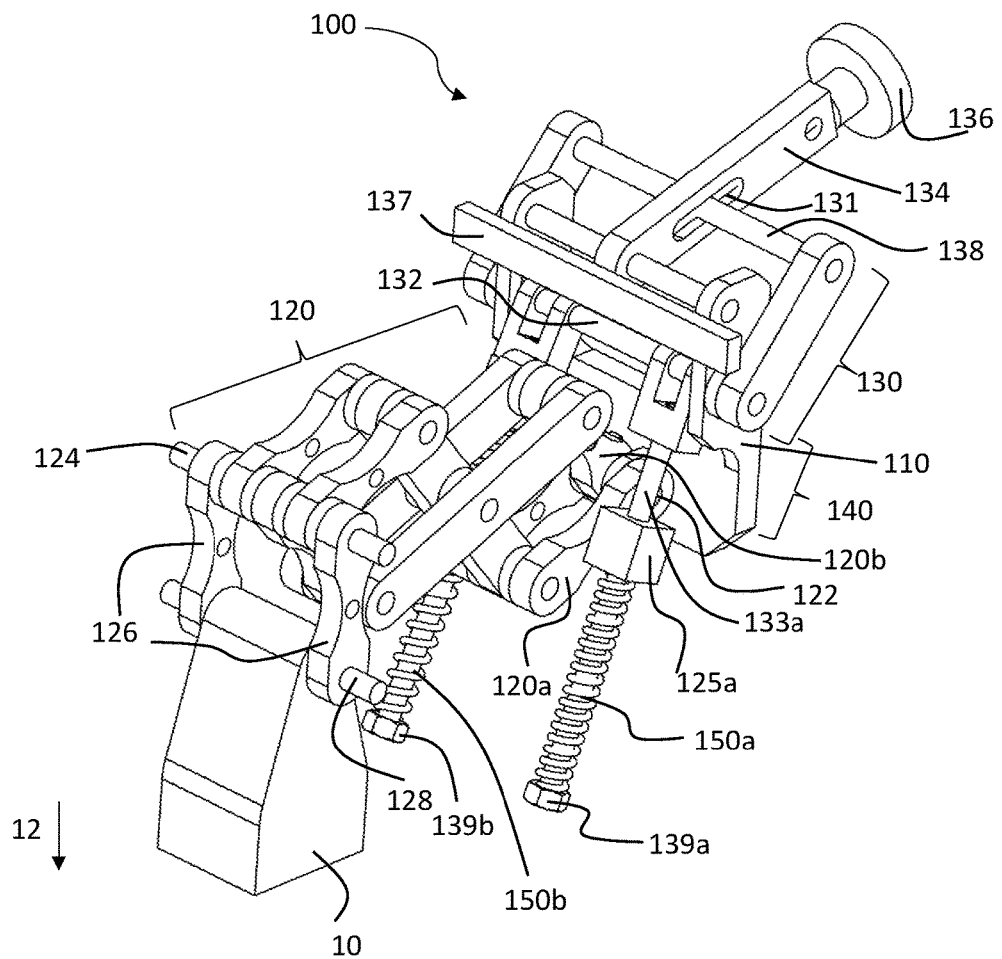
FIGS. 6A and 6B are perspective views of an alternate embodiment of the invention.
Figure 6B:
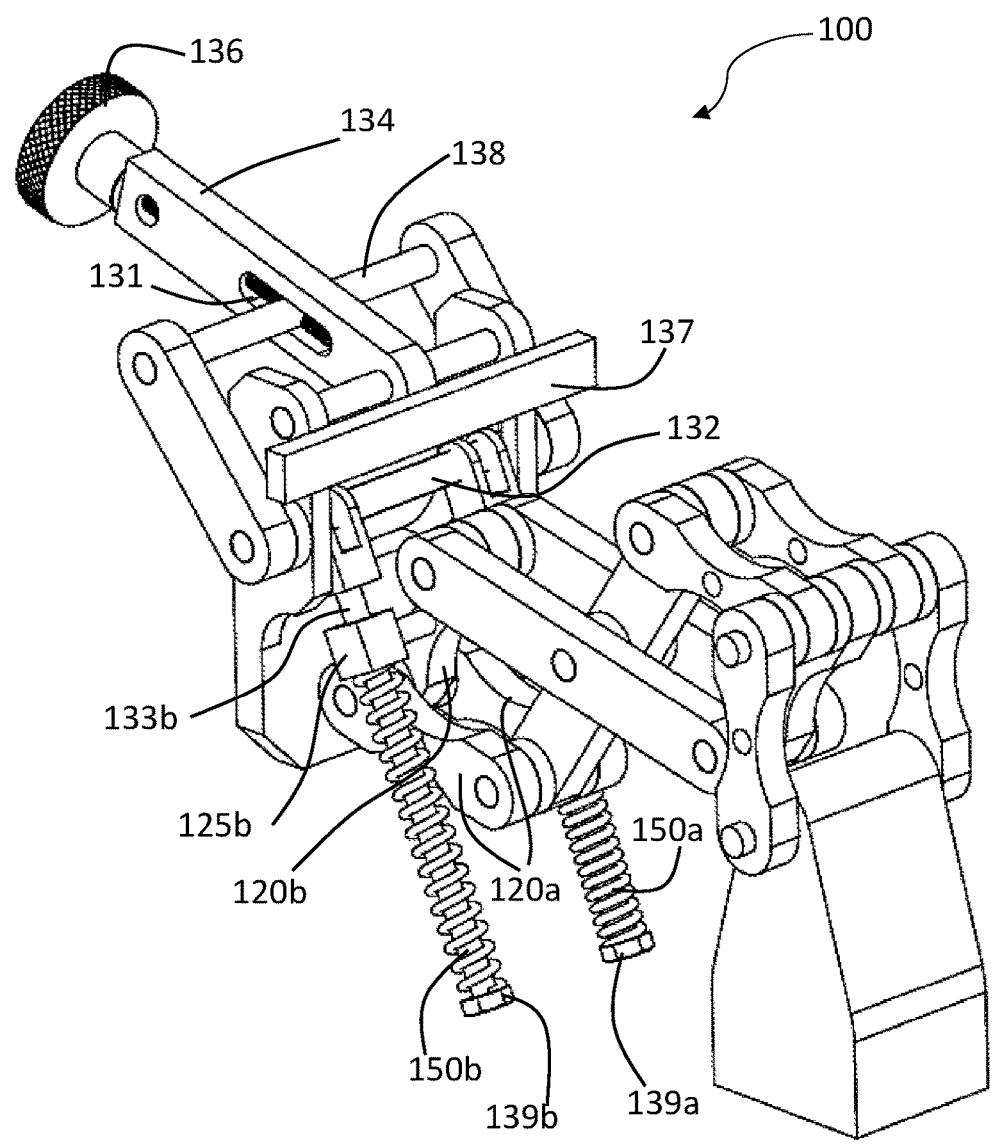

As shown in FIGS. 6A and 6B, for example, where if the resilient members 150 a,b are configured to exert a linear extension force (e.g., a compression spring), increasing the distance 140 may increase the carrying capacity of the apparatus 100. Alternatively, if the resilient members 150 a,b are configured to exert a linear compression force (e.g., an extension spring), decreasing the distance 140 may decrease the carrying capacity of the apparatus 100.

As shown in FIG. 1, the load 10 may be attached to a load coupler 126 at the distal pivot point 124 of the load bearing arm 120. In a preferred embodiment, the load 10 is coupled to the load coupler 126 using a load release mechanism 128. Those skilled in the art, however, will appreciate that the load release mechanism may include, but are not limited to, a pin, bolt, magnet, and other means to releasably or non-releasably engage the load 10 to the load coupler 126. While the load 10 can be attached to any part of the load bearing arm 120, it may be preferable, however, that the load 10 be supported by the apparatus 100 at the pivot point 124 distal to the attachment point 122. In this location, the load 10 can be manipulated distally with at least two DOF (e.g., translation along the vertical and lateral axes as shown by arrows A and B).

Figure 4A:
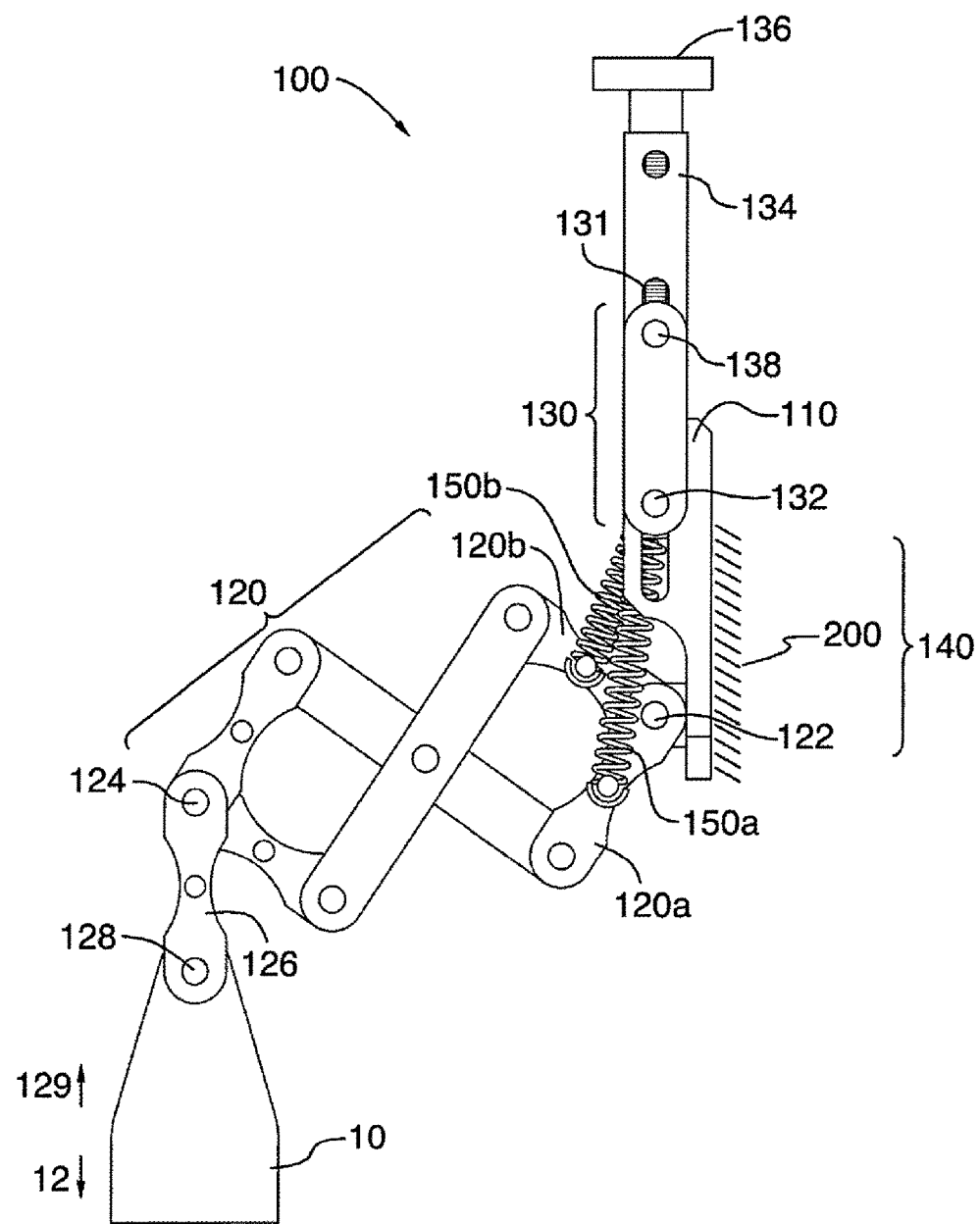
FIGS. 4A, 4B and 4C are side views and enlarged perspective views of the apparatus of FIG. 1.

The toggle linkage 130 is operatively connected to an engagement arm 134 for engaging the force exerted by the resilient members 150a,b (i.e., the load bearing position as shown in FIG. 4A) or to disengage the force exerted by the resilient members 150a,b (i.e., the non-load bearing position as shown in FIG. 3A). In this way, load 10 which has a known weight or load vector 12 (as described below) may be quickly picked up and released. There is also provided a tuning member 136 for adjusting the force exerted by the resilient members 150a,b to support loads 10 having an unknown weight. In preferred embodiments, as best seen in FIG. 1, the engagement arm 134 may be pivotally affixed to the base 110 at an arm pivot 135 and operatively engages the toggle linkage 130 in the load-bearing position as described below with FIGS. 4A-C. In a preferred embodiment, the operative connection may be provided by a slot 131 included in the engagement arm 134 that is adapted to receive the toggle pin 138.

Figure 2:
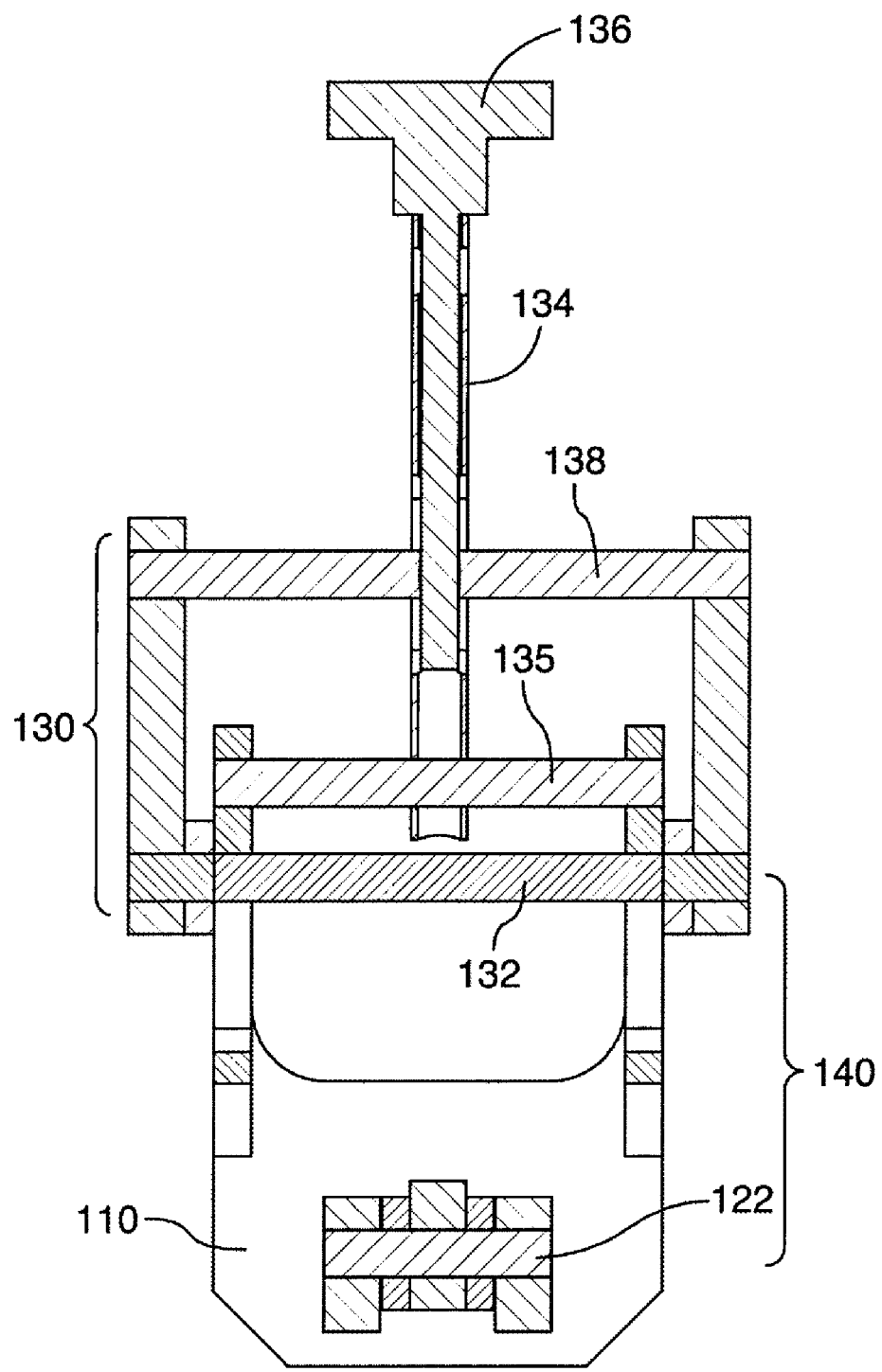
FIG. 2 is an enlarged front cross-sectional view of aspects of the invention as described in FIG. 1.

As shown in FIG. 2, the tuning member 136 is preferably received within the engagement arm 134 via a bore and threadably received in the toggle pin 138, the tuning member 136 configured to move the adjustment member 132 in response to, for example, clockwise or counterclockwise rotations of the tuning member 136. In this way, rotating the tuning member 136 clockwise or counterclockwise alters the distance 140 which causes the resilient members 150a,b (not shown) to simultaneously apply more or less force. Where the resilient members 150a,b, are springs, for example, they will be more or less compressed or expanded. This, in turn, varies the force exerted by the resilient members 150a,b and therefore varies the load 10 (i.e., load vector 12) supporting capacity of the apparatus 100. Persons skilled in the art would understand that in an alternative embodiment, the tuning member 136 is threadably received by the engagement arm 134 which, in turn, is attached to the toggle pin 138. Preferably, the engagement arm 134 is pivotally attached to the toggle pin 138. In another alternative embodiment, the tuning member 136 is threadably received by the engagement arm 134 and passes through the toggle pin 138 via a bore. In such an alternative embodiment, the tuning member 136 may further comprise a stop (not shown) to operatively engage the toggle pin 138. The position of the stop (not shown) may be dependent on whether the resilient members 150a,b exert a linear compression force or a linear extension force. Preferably, the stop (not shown) is configured to allow the toggle pin 138 to pivot. In still another alternative embodiment, the toggle pin 138 may comprise a fixed toggle projection (not shown) received within the engagement arm 134 via a bore and threadably received by the tuning member 136. In such an alternative embodiment, the tuning member 136 comprises a female thread (not shown) to receive the threaded fixed toggle projection. In each of the foregoing embodiments, slot 131 may be included in the engagement arm 134 to facilitate movement of the toggle pin 138.

In FIG. 3A, the apparatus 100 is adapted to engage or disengage the load 10. As shown in FIG. 3A, the base 110 may be attached to a fixed support 200 and the load 10 may be engaged, or disengaged, to the load coupler 126 (i.e., by activating or deactivating the load release mechanism 128, respectively) with the engagement arm 134 positioned in the non-load bearing position (see FIG. 3A), such that little or no force is exerted by the resilient members 150a,b (i.e., the resilient members 150a,b are in a relaxed or minimal-force applying state to, for example, support the weight of the load bearing arm 120 without the load 10).

Figure 3B:
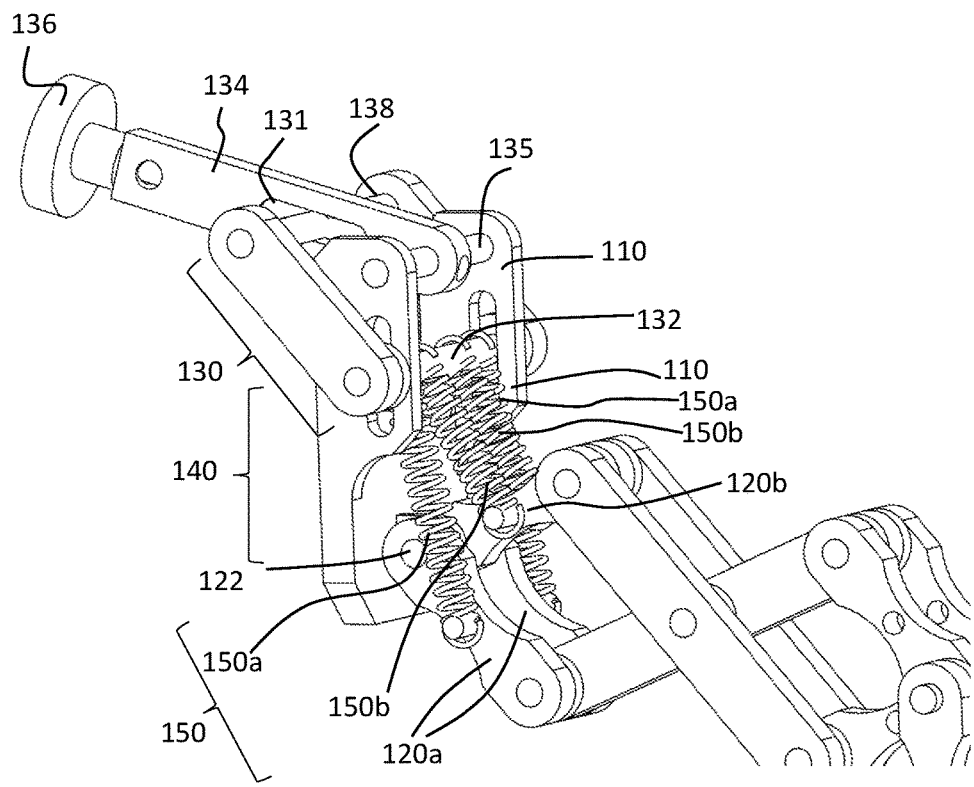

FIG. 3B is an enlarged perspective view of the apparatus 100 providing an improved view of the resilient members 150a,b as well as the adjustment member 132 and attachment point 122, which define the distance 140.

As shown in FIG. 4A, the apparatus 100 is engaged to support the load 10. As shown in FIG. 4A, the base 110 may be attached to the fixed support 200 and the engagement arm 134 is biased in (e.g., moved to) the load bearing position whereby the force exerted by the resilient members 150a,b is engaged or applied to the load 10 through the load bearing arm 120. The tuning member 136 may then be used to adjust the force applied by the resilient members 150a,b to the weight of the load 10 (i.e., load vector 12) that the apparatus 100 is to support. Persons of skill in the art would also understand that the tuning member 136 may be adjusted prior to or during, or after the movement of the engagement arm 134 into the load bearing position. In a preferred embodiment, rotating the tuning member 136 in a first direction may increase the force applied by the resilient members 150a,b to the load 10 weight (i.e., load vector 12) adjusting the distance 140. Conversely, in this embodiment, rotating the tuning member 136 in a second direction may decrease the force applied by the resilient members 150a,b load 10 weight (i.e., load vector 12) by adjusting the distance 140. In this manner, the apparatus 100 may be adjusted to produce a support vector 129 that counterbalances loads 10 of different weights (i.e., load vectors 12) and may provide isoelastic movement of the load (e.g., if the resilient members 150a,b are zero length springs). In preferred embodiments, the support vector 129 is sufficient to counterbalance the load vector 12 such that the load 10 is suspended with at least two DOF. In other words, the force of gravity may be effectively negated and the user (not shown) of the counterbalance apparatus 100 may manipulate the load 10 with reduced physical effort by the user or operator.

Thus, in operation, the counterbalance apparatus 100 can provide an adjustable exerted force in relation to the vector of gravity that may be consistent throughout the articulation of the load bearing arm 110. The resilient members 150a,b produce a counterforce (i.e., the support vector 129) to effectively cancel the load vector 12 throughout the range of motion of the load bearing arm 110. Alternatively, instead of counterbalancing the load vector 12, the apparatus 100 may be configured to produce support vectors 129 that are greater than the load vector 12 (e.g., to raise loads 10 from the ground to a shelf) or produce support vectors 129 that are less than the load vector 12 (e.g., to gently lower loads 10 from a shelf to the ground).

Persons skilled in the art may appreciate that locating the resilient members 150a,b at the base 110, compared to the prior art configuration wherein one spring is located at the base and another at the distal end of a serially connected parallelogram linkage may reduce the inertia experienced by the prior art device. Moreover, the present invention advantageously allows for the concurrent adjustment (e.g., single point adjustment) of the force exerted by the resilient members 150a,b.

Another advantage of the present invention may be that once the apparatus 100 is configured to produce a support vector 129 that counterbalances the load vector 12 (i.e., the weight of a specific load 10), only the engagement arm 134 may be required to counterbalance the load 10 (i.e., the tuning member 136 is preferably used to counterbalance loads 10 of unknown weight or load vectors 12), thereby saving time during the use or operation of the load 10.

While persons of skill in the art may understand that the load coupler 126 can be attached to any part of the load bearing arm 120, in preferred embodiments, the coupler 126 may be attached at the end of the load bearing arm 120 that is distal to the base 110—preferably at the distal pivot point 124. In this configuration, the engaged load 10 may be manipulated with at least two DOF (e.g., a first rotation about the base 110 attached to the fixed support 200 for vertical translation, and a second lateral translation to and from the base 110 attached to the fixed support 200). Fixed support 200 may include a wall and ground (including, but not limited to, a grounded pin connection). Those skilled in the art would further understand that the distal pivot point 124 and the load release mechanism 128 may provide additional DOF.

Figure 4B:
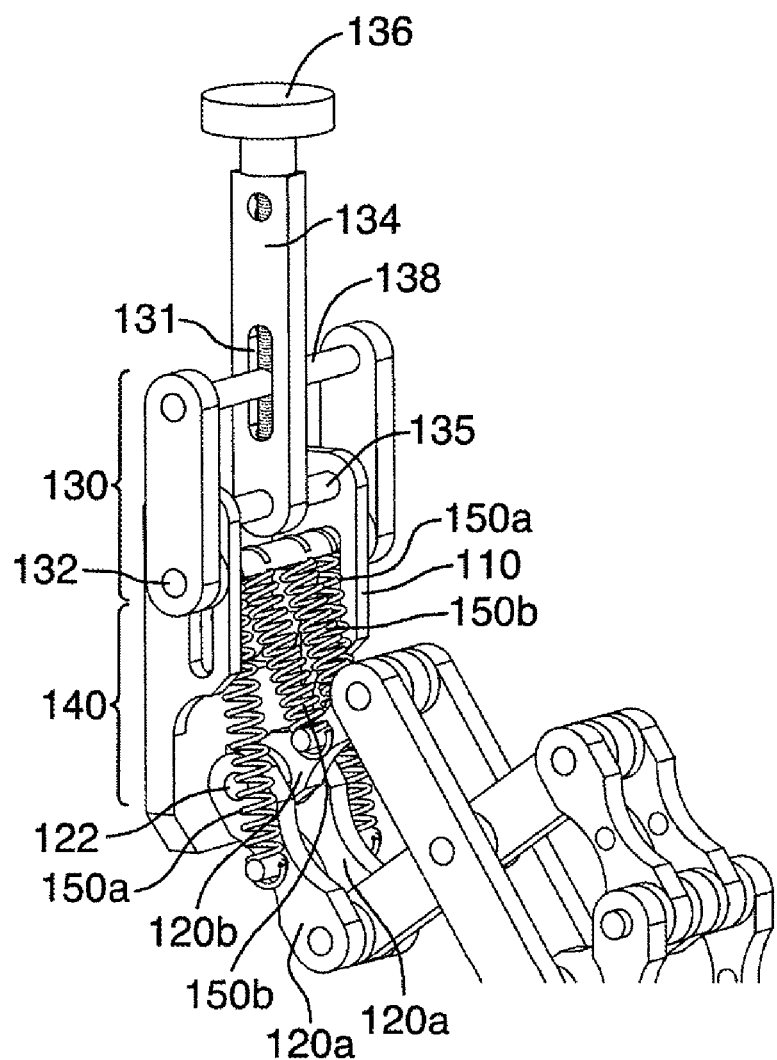

Referring to FIG. 4B, there is provided an enlarged perspective view of the apparatus 100 providing an improved view of the resilient members 150a,b and toggle linkage 130 configured to support the load 10 having a known load vector 12 (as best shown in FIG. 4A).

Figure 4C:
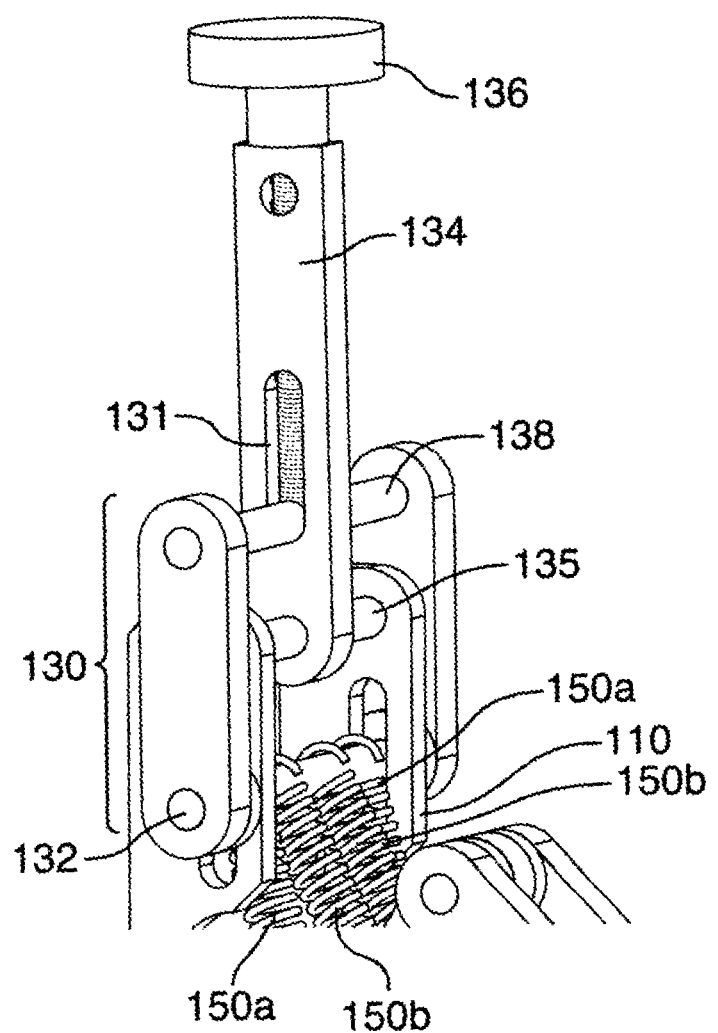

Referring to FIG. 4C, there is provided a further enlarged perspective view of the toggle linkage 130 in the load bearing position to support the load 10 having an unknown load vector 12 (not shown). The tuning member 136 is required to adjust the distance 140 (not shown) in order to cause the resilient members 150a,b to produce a support vector 129 that is sufficient to counterbalance the load vector 12 with at least two DOF (not shown).

Figure 5:
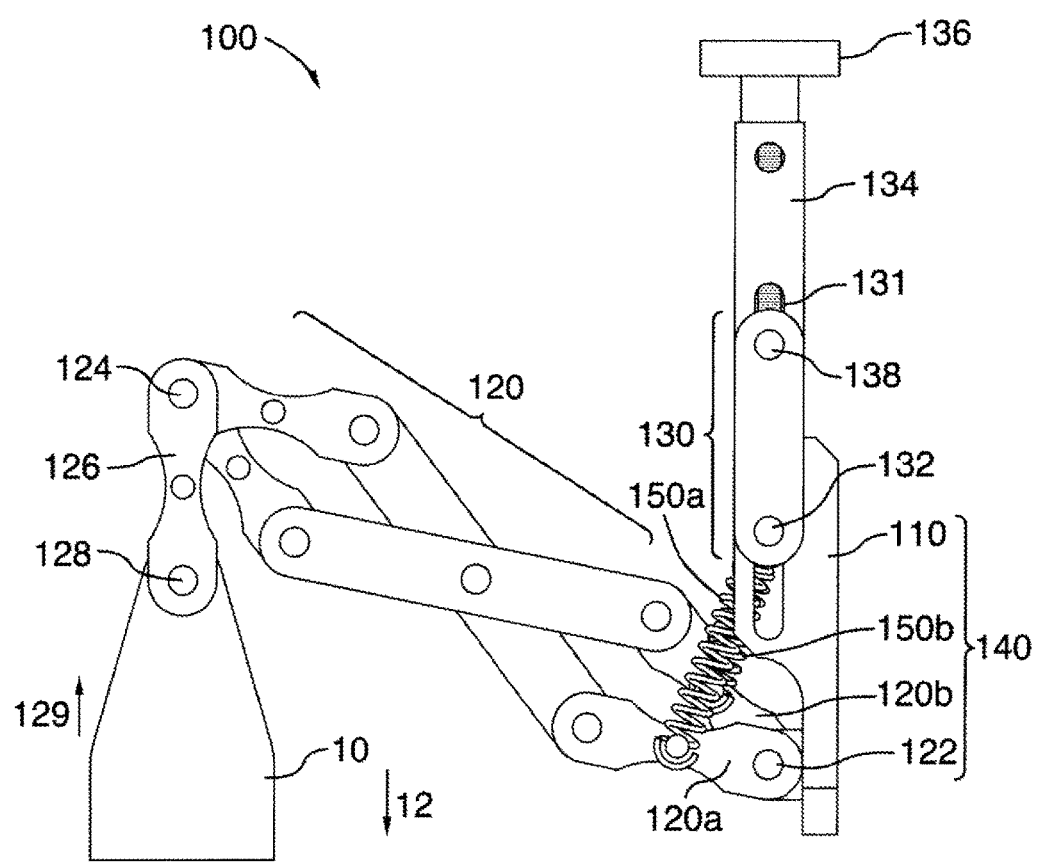
FIG. 5 is a side view of the apparatus of FIG. 1.
Figure 7A:
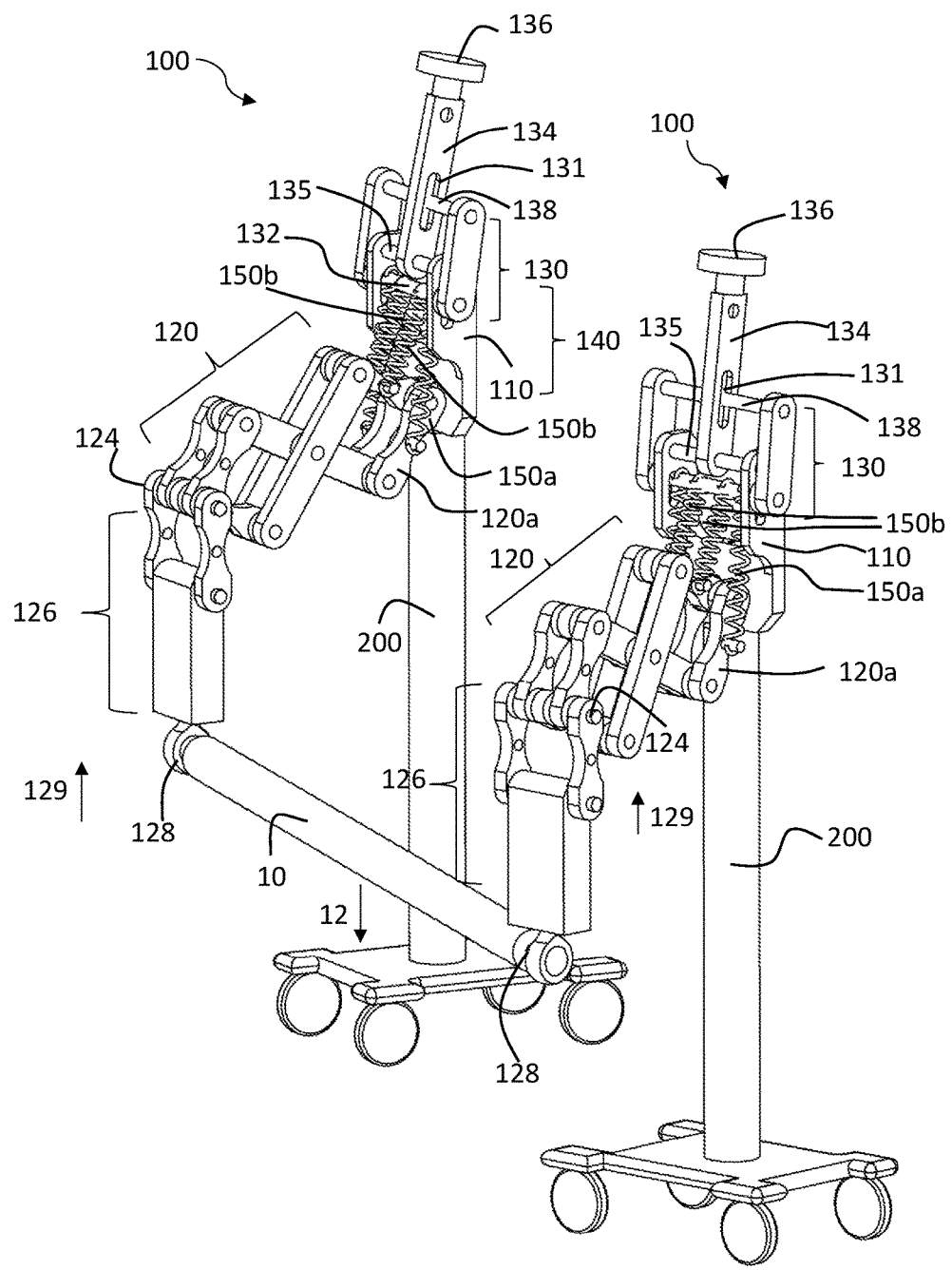
FIGS. 7A and 7B are perspective views of an alternate embodiment of the invention.
Figure 7B:
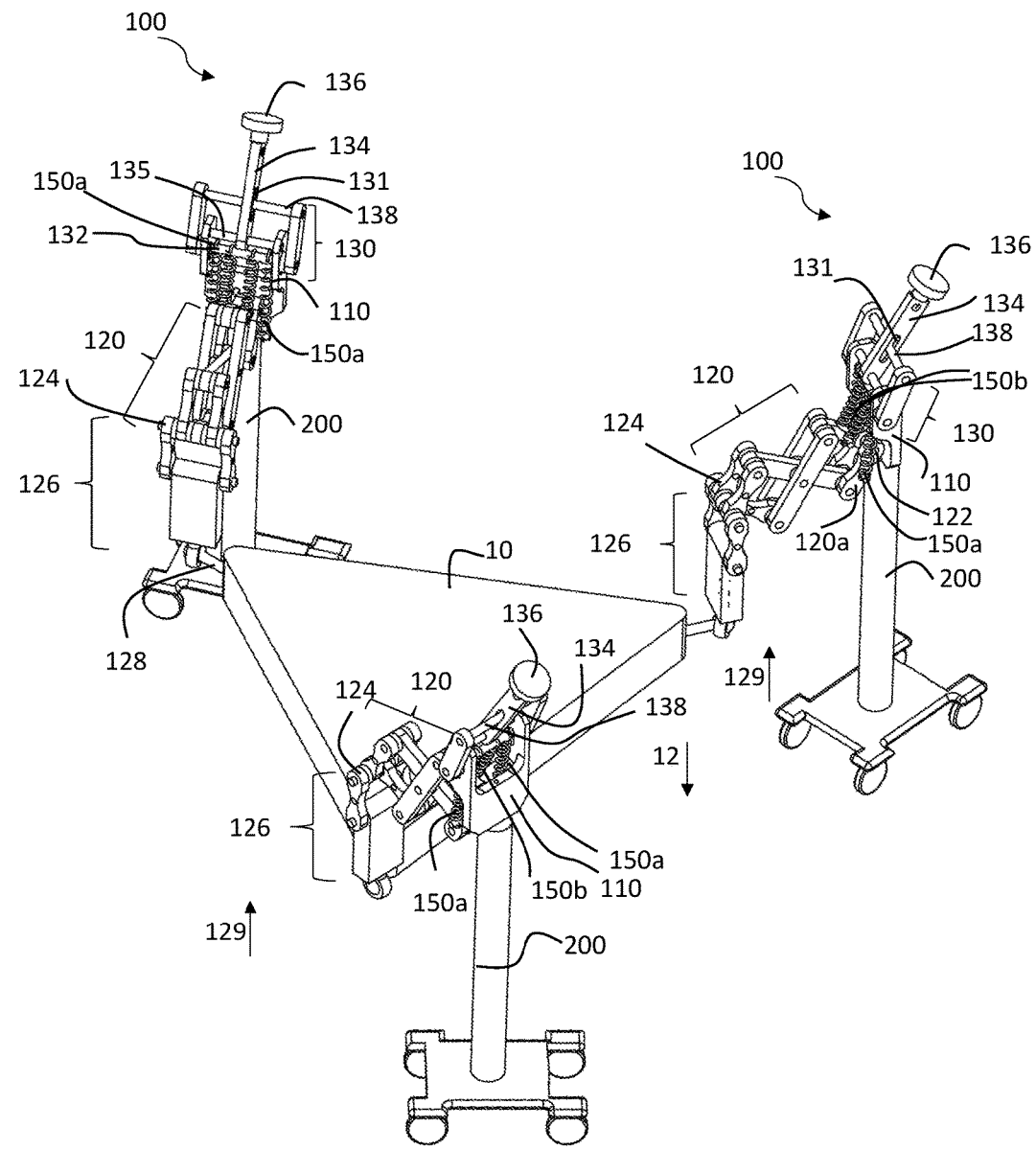

In FIG. 5, the toggle linkage 130 is in the load bearing position and the engagement arm 134 and the tuning member 136 are configured for the load 10 weight (i.e., the load vector 12 is counterbalanced by the support vector 129 produced by the resilient members 150a,b), such that the load 10 is suspended and may be manipulated using little or no effort with at least two DOF. In the depicted embodiment, a third DOF may be introduced by removing the fixed support 200 such that the load 10 can be manipulated, or pivoted, about a vertical axis defined by the base 110 (as best shown in FIGS. 7A and 7B). Depending on the type of support the apparatus 100 is mounted or attached (e.g., a rotatable vertical pole, a cart, etc.), multiple DOF may be achieved.

There is shown in FIGS. 6A and 6B, an alternate embodiment of the apparatus 100 with the toggle linkage 130 in the non-load bearing position. In this embodiment, the adjustment member 132 further comprises pivotally extending first and second projection members 133 a,b having first and second stops 139 a,b that may be threadably received at a distal end. The first and second portions 120 a,b further comprise pivotally connected first and second force couplers 125 a,b with bores adapted to slidably receive the first and second projection members 133 a,b respectively. The first and second resilient members 150 a,b have a first end connected to the first and second force couplers 125 a,b of the first and second portions 120 a,b and a second end connected to the adjustment member 132 at the first and second stops 139 a,b. The first and second stops 139 a,b are a one-time adjustment used to configure, or preload, the resilient members 150 a,b to behave as zero length springs. In this embodiment, the force exerted by the resilient members 150 a,b may cause the load arm 120 to produce a support vector when the toggle linkage 130 is in the load bearing position.

There is shown in FIG. 7A, an alternate embodiment of the apparatus 100 with two apparatuses 100 in parallel and supporting a load 10 that is long and slender. The load 10 may be supported by the load bearing arm 120 via load couplers 126 that provide for movement in at least two planes at the same time (e.g., a ball joint or universal joint). This alternate embodiment facilitates movement in at least five DOF (e.g., translation along the x, y and z-axes, and two degrees of rotation, yaw and pitch).

As shown in FIG. 7A, each apparatus 100 preferably includes a separate tuning member 136 and engagement arm 134 for picking up the load 10. The tuning member 136 on each apparatus 100 adjusts the load 10 carrying capacity and weight that each apparatus 100 supports. For example, if the load 10 is distributed evenly between each load bearing arm 120, the tuning member 136 for each apparatus 100 would be identically configured so that each arm 120 would support half of the load 10. The engagement arms 134 may be operated independently to pick up the load 10 or connected in order to lift and/or release the load 10 using a single control source (not shown). In preferred embodiments, the arms 134 may be connected mechanically (e.g., pneumatic cylinders attached to each arm 134, not shown) and the control source may be a switch or a button.

There is shown in FIG. 7B, an alternate embodiment of the apparatus 100 with three apparatuses 100 in parallel to support and/or manipulate a load 10 (e.g., a large plate) with at least six DOF. The load 10 may be supported by the load bearing arms 120 via load couplers 126 that provide for movement in at least two planes at the same time (e.g., a ball joint or universal joint). This alternate embodiment facilitates movement in at least six DOF (e.g. x, y, and z-axes and three degrees of rotation, yaw, pitch, and roll).

As shown in FIG. 7B, each apparatus 100 preferably includes a separate tuning member 136 and engagement arm 134 for picking up a portion of the load 10. The tuning member 136 on each apparatus 100 is used to adjust the load 10 carrying capacity and weight distribution that each apparatus 100 supports. For example, if the load 10 center of gravity is located centrally between each load bearing arm 10, the tuning member 136 for each apparatus 100 would be identically configured so that each arm 120 would support one-third of the load 10. The engagement arms 134 may be operated independently to pick up the load 10 or connected in order to life and/or release the load 10 using a single control source (not shown). In preferred embodiments, the arms 134 may be connected mechanically (e.g., pneumatic cylinders attached to each arm 134, not shown) and the control source may be a switch or a button. Those skilled in the relevant art would understand that this alternative embodiment may include more than three apparatuses 100 working in parallel to support a load 10.

Persons skilled in the art may appreciate that the apparatus 100 may be configured to be fully passive, semi-automated or fully automated in operation. In the fully passive configuration, the apparatus 100 may be adjusted manually and is only used to produce a support vector 129 for counterbalancing the weight of a load 10 (e.g., a tool) or a load vector 12. In the semi-automated configuration, the apparatus 100 may be manually adjusted while a control unit such as those well known in the art is operatively encoded with one or more algorithms stored in memory (not shown) to provide orientation logic in order to track the orientation and/or position of the load 10. The control unit can be used to determine whether the load 10 remains within a pre-determined workspace (not shown) or is oriented at a particular target (not shown). In the fully automated configuration, the apparatus 100 may be adapted to include one or more motors and/or pneumatic/hydraulic cylinders (not shown) to adjust the engagement arm 134 and/or the tuning member 136 and/or the load bearing arm 120. Advantageously, low torque motors may be used given the ability of the apparatus 100 to negate the effect of gravity on a load 10. The fully automated configuration may be preferable in situations where the apparatus 100 is operated in a harsh environment. Fully automated configurations may also be adapted to operate remotely.

The commercial applications of the apparatus 100 are wide ranging and span both the medical and non-medical fields. The apparatus 100 may be valuable for any application where a user (not shown) may encounter difficulties supporting or positioning a load 10 (e.g., tool). Difficulties with respect to supporting or positioning the load 10 may arise from: awkward motions, high load weight, maintaining a fixed position for long periods of time, are operating within confined spaces, or high positioning accuracy requirements. The apparatus 100 of the present invention may be adapted to produce a support vector 129 to counterbalance the weight (i.e., load vector 12) of any load (e.g., tool) engaged to the end of a two degree of freedom pinned load bearing arm 120. Loads 10, such as tools, on the end of the load bearing arm 120 can be translated and rotated as well as remain in position and/or orientation, if desired.

Furthermore, since the apparatus 100 counterbalances the weight of the load 10, the force the user (not shown) must exert to adjust the position of the load 10 may be substantially reduced and may be iso-elastic using a zero length configuration for the resilient members 150a,b. For greater stability, manual or automatic brakes (not shown) can be applied to lock the apparatus 100 in place once the load 10 is at a desired position and/or orientation.

As an example, the apparatus 100 can be used to reduce many of the aggravating factors reported by individuals such as sonographers and vascular technologists. Loads 10, such as an ultrasound transducer, can be coupled onto the load bearing arm 120. The sonographer in this case, could manually adjust the position of the transducer until the desired imaging plane is acquired. The sonographer would then release the transducer and the apparatus should maintain the transducer position and apply the necessary transducer pressure. Use of the apparatus 100 would provide a solution related to prolonged arm abduction, prolonged twisting and application of transducer pressure by the sonographer.

In another embodiment, the apparatus 100 can be configured as a fully automated robotic arm for medical applications. Motors can be mounted onto the apparatus 100 to adjust the load bearing arm 120 pose. The design of the present apparatus 100 counterbalances loads 10 using resilient members 150a,b. As a result, low torque motors can be used to drive the apparatus 100 and are not required to maintain a position and/or orientation. Furthermore, the apparatus 100 can be fully back-drivable allowing the position and/or orientation of the load 10 to be manually adjusted in the event of a power failure. The present apparatus 100 is unique amongst medical robotics since the design provides an additional intrinsic level of safety over previous medical robotic designs.

Notably, the apparatus 100 can be scaled up for industrial applications (e.g., supporting heavy items) or down for entertainment applications (e.g., toy) as required. The foregoing are examples only and are not intended to limit the potential applications of the apparatus 100.

In the present apparatus 100, only a single adjustment at the base 110 is required to produce the support vector 129 that is sufficient to counterbalance the load vector 12 with at least two DOF. Furthermore, to adjust the counterbalance for varying loads 10 at a point of adjustment using the prior art design may have required cables to be routed through the arm to adjust both springs simultaneously.

In some embodiments, the resilient members 150 a,b may be zero length (as shown in FIGS. 6A and 6B) or non-zero length spring design (as shown in FIGS. 1-5, 7A and 7B) as may have been described in Agrawal, A et al., Mechanism and Machine Theory 40 (2005) 693-709, herein incorporated by reference. In still other embodiments the apparatus 100 may comprise a mix of resilient members 150 a,b that exert a compression force and those that exert an extension force.

The embodiments of the present invention may also advantageously provide a simpler and more effective solution to counterbalance loads of known or unknown weight over the prior art. For example, instead of using two serially connected parallelograms to provide two DOF, a single pinned parallelogram may be used in its place. The single pinned parallelogram may have the advantage of providing similar flexibility as the prior art except in a more compact package (i.e., one instead of two parallelograms). In addition, two springs located at the base may preferably, but need not necessarily, be used for counterbalancing the load instead of the prior art, which uses one spring at the base and one spring at the distal end of the serially connected parallelogram linkage to reduce the inertia of the arm. In addition, in the present apparatus and/or method, both the first and second resilient members can be adjusted at the same time making it easier to design an apparatus to quickly pick up and release loads.

Consequently, in the embodiments of the present invention, only a single adjustment is required at the base in comparison to the prior art which may require cables to be routed through the arm to adjust multiple springs simultaneously.

The foregoing description has been presented for the purpose of illustration and is not intended to be exhaustive or to limit the invention to the precise form disclosed. Other modifications, variations and alterations are possible in light of the above teaching and will be apparent to those skilled in the art, and may be used in the design and manufacture of other embodiments according to the present invention without departing form the spirit and scope of the invention. It is intended the scope of the invention be limited not by this description but only by the claims forming a part hereof.

The embodiments for which an exclusive privilege or property is claimed are as follows:

1. A counterbalance apparatus for supporting a load having a load vector applied in a direction of the vector of gravity, comprising:
   a base movable between a load bearing and a non-loading position;
   a load bearing arm with a plurality of pivot points forming a parallelogram linkage, the load bearing arm projecting from the base at a first attachment point at a proximal end and adapted to support the load at a distal end;
   a first resilient member for applying a force to the load bearing arm having a first end connected to a first portion of the parallelogram linkage and a second end connected to a second attachment point of the base; and
   a second resilient member for applying a force to the load bearing arm having a first end connected to a second portion of the parallelogram linkage and a second end connected to the second attachment point of the base; and
   wherein movement of the base from the non-load bearing position to the load bearing position engages the forces of the first and second resilient members to apply a support vector to counterbalance the load vector.

2. The counterbalance apparatus of claim 1, in which the first and second resilient members are adapted to produce a linear extension force.

3. The counterbalance apparatus of claim 1, in which the first and second resilient members are adapted to produce a linear compression force.

4. The counterbalance apparatus of claim 1, wherein the first and second resilient members are each a pair of resilient members.

5. The counterbalance apparatus of claim 1, in which the parallelogram linkage comprises at least one parallelogram.

6. The counterbalance apparatus of claim 5, in which the parallelogram linkage comprises at least one compound parallelogram.

7. The counterbalance apparatus of claim 1, in which the load is reversibly coupled to a distal pivot point of the load bearing arm by a load release mechanism.

8. The counterbalance apparatus of claim 1, wherein the support vector counterbalances the load vector with at least two degrees of freedom.

9. The counterbalance apparatus of claim 1, in which the base is connected to a fixed support.

10. The counterbalance apparatus of claim 1, in which the base is connected to a fixed support by a grounded pin connection.

11. The counterbalance apparatus of claim 1, further comprising a brake adapted to maintain a position with respect to the load.

12. The counterbalance apparatus of claim 1, wherein the first and second resilient members are each a zero length spring.

13. The counterbalance apparatus of claim 1, wherein the first and second resilient members are each a non-zero length spring.

14. The counterbalance apparatus of claim 1 configured to be fully passive in configuration.

15. The counterbalance apparatus of claim 1 configured to be semi-automated in configuration.

16. The counterbalance apparatus of claim 1 configured to be fully automated in configuration.

17. The counterbalance apparatus of claim 1 configured to be a fully automated robotic arm for a medical application.

* * * * *